Nov. 5, 1968  B. W. BRUNSON  3,408,961

TAKE-OFF KNIFE ARRANGEMENT

Filed July 6, 1967  2 Sheets-Sheet 1

INVENTOR.
BRUCE W. BRUNSON
BY
ATTORNEYS

INVENTOR.
BRUCE W. BRUNSON
BY Price, Heneveld
Huizenga & Cooper
ATTORNEYS

United States Patent Office 3,408,961
Patented Nov. 5, 1968

3,408,961
TAKE-OFF KNIFE ARRANGEMENT
Bruce W. Brunson, Grand Rapids, Mich., assignor to Werner Machinery Co., Grand Rapids, Mich., a corporation of Michigan
Filed July 6, 1967, Ser. No. 651,475
8 Claims. (Cl. 107—12)

ABSTRACT OF THE DISCLOSURE

A dough sheeting apparatus having a pair of adjustably spaced rolls between which dough is adapted to pass to be flattened. The dough is scraped from the rolls by a takeoff knife adjustable about the periphery of one of the rolls and passes in continuous fashion onto an adjacent conveyor belt. The frame which adjustably carries the take-off knife also carries the idler roller for the conveyor belt. The conveyor belt, thus, always maintains the same position relative to the take-off knife despite the peripheral position of the latter element.

Background

This invention relates to sheeting machines and, more particularly, to a take-off knife and receival belt adjustment assembly adapted for utilization in edible product sheeting machines.

In the preparation of edible products, it is often desirable to flatten or roll a moldable, edible substance in continuous-sheet fashion as a means of preparing it for further processing steps such as cooking, cutting and the like. For example, in preparing baking dough, it has become customary to sheet the dough to the desired thickness by passing it between a series of pairs of guaging rolls positioned successively closer together until the sheet has attained the desired thickness for further processing. Usually, these products have a tendency to stick to the guaging rolls and, thus, some means must be provided for continuously removing them therefrom so that the sheet may pass to a subsequent processing station. Such means are necessitated particularly when the dough being processed is of relatively light texture and subject to tearing or parting easily.

As a means of achieving the removal of the dough from the gauging rollers, it has become customary in the art to utilize an elongated take-off knife abutting the periphery of one of the gauging rolls along its entire length. As the dough passes in contact with the edge of the take-off knife, it is scraped free from the roll and the sheet is rendered free to pass onto the next processing station. Depending upon the particular type of dough or the like being processed, the optimal peripheral position of the take-off knife may lie along any number of points on the periphery of the particular gauging roll to which the dough tends to stick. Many such sheeting devices, therefore, incorporate means for adjusting the take-off knife position about the periphery of the roll. One such adjustment device, for example, is shown in United States Patent No. 1,763,320 issued June 10, 1930, to Paterson.

The material being sheeted must be supported, of course, on either side of the gauging roll assembly by means such as continuous conveyor belts. Since the desirability of uniform thickness and surface finish dictate that each side of the dough be contacted by the opposed gauging rollers, it is necessary that the dough or the like being sheeted leave the conveyor mechanism prior to passage between the gauging rolls and, then, fall back onto the same or a separate conveying medium. In order to obtain optimum sheeting performance from the particular equipment, it is desirable that the receiving conveying medium be adjustable with respect to the gauging roll assembly such that the distance which the dough must drop thereonto after being removed from the gauging roll by the take-off knife does not vary widely depending upon the particular adjusted position of the take-off knife about the periphrey of the roll. This is particularly true when fine, highly textured material is being processed, since the fall to the receiving belt may cause it to tear.

In the past, as illustrated in the patent identified above, the adjustment of the receiving belt medium has been independently executed subsequent to adjustment of the take-off knife by raising its support table through the utilization of means such as a screw-type jack. This particular procedure is subject to many apparent difficulties. First, the mere necessity of making two independent adjustments occupies a good deal of the operator's time, particularly when optimum relative adjustment can only be obtained by a somewhat hit and miss process. Second, the circular nature of the gauging rolls renders the provision of a separate lateral belt receiving medium adjustment necessary if the lateral displacement of the end of the receiving medium with respect to the take-off knife is to be maintained. This, of course, results in further expenditure of time by the operator and renders the achievement of optimal knife and receiving band adjustment even more difficult.

Objects and specification

It is an object of this invention to provide an apparatus of the type described which is not subject to the disadvantages outlined above.

More particularly, it is an object of this invention to provide a sheeting apparatus wherein the optimal relative positioning of the take-off knife and the receiving band may be easily achieved when it becomes necessary to change the position of the take-off knife to accommodate another type of dough-like product.

It is an object of this invention to provide a device of the type described wherein a single adjustment of the take-off knife by the operator automatically and simultaneously moves the receiving band into proper position for optimal material processing.

It is an object of this invention to provide a device of the type described wherein the tendency of the receiving belt to slacken or tighten depending upon the particular position of its receiving section with respect to the gauging roll is automatically compensated during adjustment of the take-off knife.

It is yet another object of this invention to provide a device of the type described wherein adjustable take-off knives are provided on each of the gauging rolls of a particular set and, wherein the adjacent section of the receiving belt may be adjusted so as to perform optimally regardless of which particular take-off knife is being utilized to scrape the dough-like substance from the gauging rolls.

These, as well as other objects of this invention, will be readily apparent by reference to the following specification and accompanying drawings in which.

Figure 1:
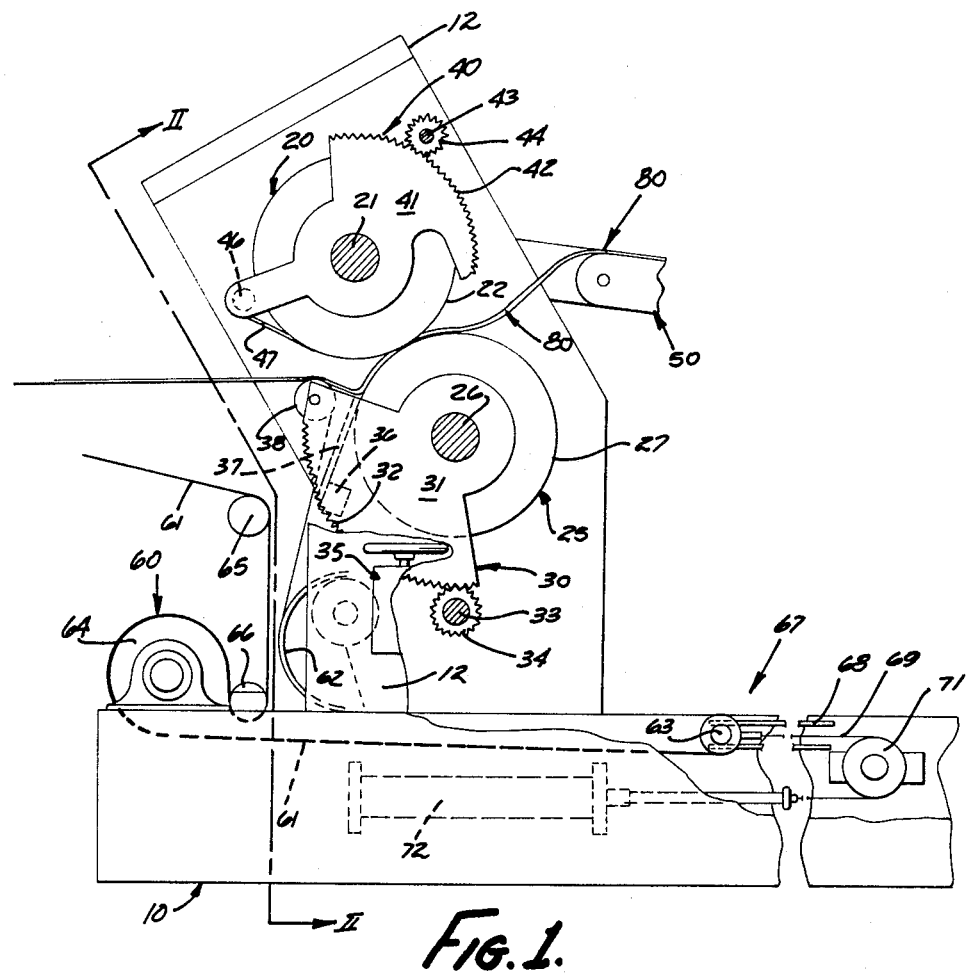
FIG. 1 is a fragmentary, side-elevational view of the sheeting apparatus which is the subject of this invention.

Briefly, this invention comprises a sheeting apparatus for dough-like materials having upper and lower gauging rolls between which dough is run. A section of a movable receiving belts is positioned adjacent the exit side of the rolls and adapted to receive the dough-like material as it exits therebetween. The take-off knife is positioned in abutting relation with at least one of the rolls to scrape the dough therefrom as it exits from its passage between the rolls. The take-off knife is adjustable about a section of the periphery of its associated roll and means are provided for simultaneously adjusting the position of the receiving section of the belt as the knife is adjusted whereby the receiving section retains the same relative position wth respect to the knife.

Referring now to the figures a preferred embodiment of this invention will be illustrated in detail. The frame assembly, indicated generally by the reference numeral 10, comprises a pair of base channels 11 and upstanding side walls 12. Rotatably suspended between side walls 12 are an upper gauging roll assembly 20 and a lower gauging roll assembly 25. The gauging roll assemblies 20 and 25 are powered by conventional means (not shown) and, additionally are vertically adjustable with respect to one another so that the thickness of the material being rolled can be controlled. The vertical adjustment means are also well-known in the art and have been deleted from the drawings as a means of simplifying and rendering more easily understandable the concepts of this invention.

Upper gauging roll assembly 20 comprises a cylindrical roll member 22 suitably affixed to a shaft 21. Similarly, lower gauging roll assembly 25 comprises a shell or roll member 27 rotatably mounted about shaft 26. The dough or other material to be gauged is fed between rolls 22 and 27 in a manner to be fully described hereinafter. The relative vertical disposition of the rolls, of course, determines the thickness of the sheet.

Figure 2:
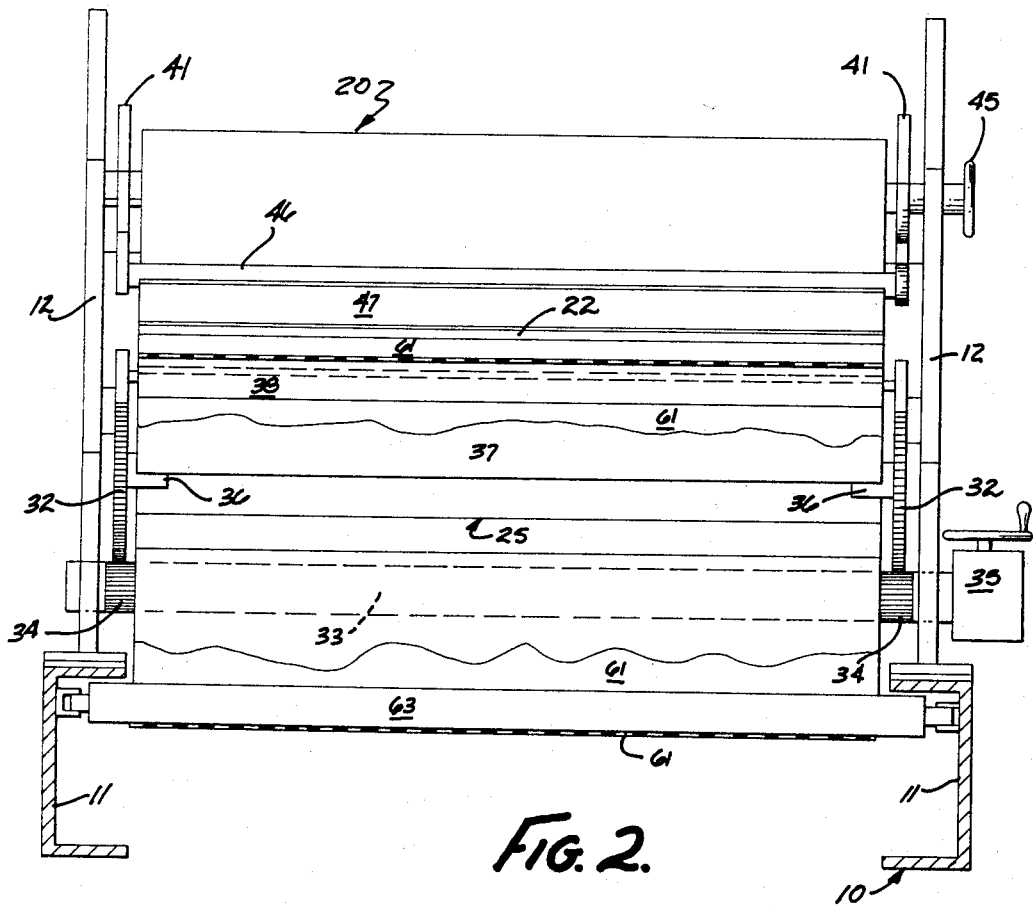
FIG. 2 is a broken, cross-sectional view taken along plane II—II of FIG. 1.

The lower knife adjustment assembly 30 comprises a pair of mounting plates 31 rotatably journaled on the central shaft 26 of the lower gauging roll assembly 25. As shown in FIG. 2, the mounting plates are positioned at each extremity of shell member 27. The mounting plates 31 have a geared arcuate periphery indicated generally by the reference numeral 32. An adjustment shaft 33 having a pair of geared sections 34 machined therein or mounted thereon is rotatably supported between opposite side walls 12 at such a position that the geared sections 34 intermesh with the geared peripheries 32 of mounting plates 31. Shaft 33 is rotated by means of a conventional right-angle adjustment assembly 35.

Suspended between the mounting plates 31 by means of knife support blocks 36 is an elongated take-off knife indicated generally by the reference numeral 37. Preferably, the knife is biased against shell member 27 of roller assembly 25 by means of a pair of twist springs positioned at either end of the knife assembly such that they bias the scraping edge of knife 37 into abutment with shell member 27. Also suspended between mounting plates 31 is a conventional belt roller 38. Belt roller 38 is, of course, rotatably mounted with respect to these plates.

The upper knife adjustment assembly 40 comprises a pair of mounting plates 41 rotatably mounted on upper gauge roll assembly shaft 21. The upper mounting plates 41 have geared peripheries 42 and, in a manner similar to that described in connection with the lower knife adjustment assembly, are adjustable by means of an adjustment shaft 43 having a pair of geared sections 44 thereon intermeshing with geared surfaces 42. Adjustment shaft 43 may be rotated by means of a conventional adjustment wheel 45 or, if necessary, another right-angle adjustment device may be utilized.

Suspended between suitable radially extending brackets on mounting plates 41 by means of a conventional support 46 is an upper take-off knife 47. Preferably, take-off knife 47 is biased into abutment with shell member 22 of the upper roll assembly by means of twist spring (not shown) positioned at either of its mounting points on plates 41.

Figure 3:
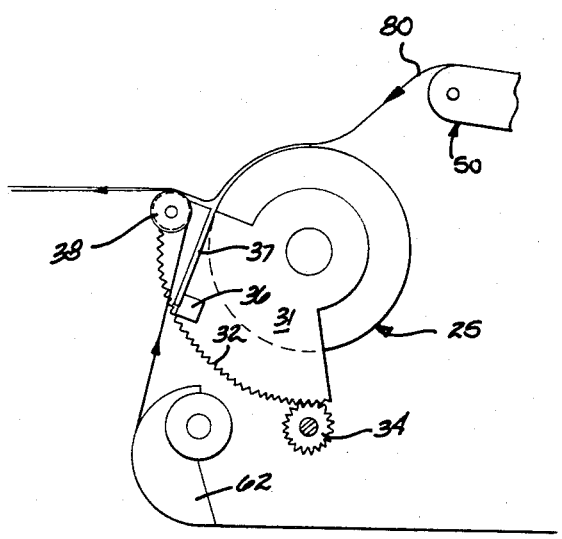
FIG. 3 is a schematic illustration of the take-off knife and belt wrap roller adjustment assembly.

The dough is fed to the gauging roll assembly by means of a feed belt assembly indicated generally by the reference numeral 50 (see FIGS. 1 and 3). The feed belt assembly 50 may carry the dough, for example, from a previous piece of equipment such as a flour duster or the like through which a sheet of dough is being passed in a continuous-strip fashion. After initial threading, the dough leaves feed belt assembly 50 and passes unsupported between upper gauging roll assembly 20 and lower gauging assembly 25 to be rolled to the desired thickness and texture.

The take-off belt assembly, indicated generally by the reference numeral 60, comprises a conventional belt 61 continuously threaded about roller 38 mounted between adjustment plates 31, belt slide 62, take-up roller 63, drive roller 64 and idler rollers 65 and 66. The forward section of the take-off belt may, of course, proceed toward any piece of subsequent processing equipment, depending upon the particular operation being executed.

Take-up roller 63 is slidably mounted in a suitable track 68 positioned on the interior of either side of the apparatus. The roller mounts are connected to the cable 69 which traverses about pulley 71 and is affixed to the piston rod of a suitable hydraulic or spring bias cylinder 72.

*Operation*

As the continuous sheet of dough or other material 80 leaves feed belt assembly 50, it passes between gauging roll assemblies 20 and 25. Depending upon the particular type of material being processed, it may be desirable to allow the sheet of dough 80 to remain affixed to the lower shell member 27 for a relatively short or relatively long segment of its circumferential length after passage between the rollers. This affixation length is controlled by the peripheral position of knife 37. The adjustment of drive 35 effectively moves the take-off knife to successively lower or upper positions on the periphery of shell member 27.

It will be noted that knife 37 is positioned with respect to mounting plates 31 in such a manner that it always remains tangential to the periphery of shell 27 regardless of the rotational position of the mounting plates and, thus, the peripheral position of the knife about shell 27. Such positioning allows the leading edge of the take-off knife to remain in abutment with the roll periphery, despite its peripheral adjustment on the surface of the gauging roll.

As adjustment assembly 35 is rotated and, thus, the mounting brackets 31 and suspended knife 37 move to varying peripheral positions on shell 27, the belt roller 38 maintains an identical relative position with respect to the working edge of the take-off knife, since it also relates with mounting plates 31. Thus, the entire adjustment procedure may be executed by merely turning right-angle drive adjustment assembly 35 until the knife has assumed the proper peripheral position.

The receiving section of the belts 61 will automatically adjust, both vertically and laterally, to compensate for changes in the position of the take-off knife.

During the adjustment procedure, slack in the take-off belt 61 is provided or taken up by means of the take-up assembly 67. If, for example, the roller 38 is lowered, as viewed in FIG. 1, cylinder 72 will pull take-up roller 62, via cable 69, to the right within tracks 68 to take-up the slack created by the movement. Similarly, if the mounting plates, knife and roller 38 are moved upwardly or clockwise, as viewed in FIG. 1, the constant pressure cylinder 72 will allow its piston rod to move out of the cylinder and, thus, allow take-up roller 63 to move to the left and place additional slack in the take-off belt.

In some types of operations, it is preferable that the dough stick to the upper gauging roll, rather than the lower gauging roll, during the gauging process. The assembly illustrated is particularly adaptable to this type of operating environment. The lower knife adjustment assembly is moved to its extreme clockwise position (similar to that actually shown in FIG. 1) and the upper take-off knife 47 adjusted to the desired peripheral position about shell 22 by rotating shaft 43. Again, knife 47 is affixed preferably to the mounting plates 41 in such a manner that it always remains tangential to the shell 22, despite its peripheral position with respect thereto. With the components so adjusted, as the dough strip 80 is scraped from the surface of upper gauging roll assembly 20 by take-off knife 47, it falls only a short distance onto the surface of belt 61 for transferral to the subsequent apparatus in the processing line.

In light of the foregoing descriptions, it is believed that the various advantages afforded by the instant apparatus over prior devices will be readily appreciated by those skilled in the art. The suspension of the receiving belt support roller most closely adjacent the take-off position on the gauging roll between the knife adjustment brackets permits vertical and lateral adjustment of the receiving belt section simultaneous with adjustments in the peripheral position of the take-off knife. Optimum positioning may be designed directly into the machine or, alternatively, a series of supports or apertures for the roller 38 might be provided in mounting plates 31 for utilization with different types of gauging processes. Thus, the apparatus eliminates the necessity of first adjusting the take-off knife and thereafter adjusting the receiving belt both vertically and laterally until optimum performance is obtained from the apparatus. The mounting of the plates 31 about the axis of rotation of the associated roll, of course, causes roller 38 to move in a radial manner and, thus, insures that it will maintain its optimum positioning relative to the take-off knife and the gauging roll at all positions.

While a preferred embodiment of this invention has been illustrated in detail, it will be readily apparent to those skilled in the art that numerous other embodiments may be conceived and fabricated without departing from the spirit of this specification and the accompanying illustrative drawings. Such other embodiments are to be deemed as included within the scope of the following claims unless these claims, by their language, expressly state otherwise.

I claim:

1. In a dough sheeting apparatus having upper and lower gauging rolls between which dough is run, a section of a movable belt positioned adjacent said rolls and adapted to receive the dough as it exists from said gauge rolls, and a take-off knife positioned in abutting relation with one of said rolls and adjustable about a section of the periphery thereof, the improvement comprising means for simultaneously adjusting the position of said belt section as said knife is adjusted whereby said belt section retains the same relative position with respect to said knife.

2. The apparatus as set forth in claim 1 wherein said simultaneous adjusting means comprises:
   a mounting plate adjustably borne at either end of said one roll, said knife being positioned between and affixed to said plates such that its edge moves to different locations on the periphery of said one roll as said plates are adjusted; and
   a belt roller rotatably journaled between said plates and adjustable therewith, said belt passing around said roller.

3. The apparatus as set forth in claim 2 which further comprises means for taking up and letting out slack in said belt as said plates are adjusted.

4. The apparatus as set forth in claim 2 wherein said plates adjust said knife about said one roll such that said knife retains the same relative angle with respect thereto as said plates are adjusted.

5. The apparatus as set forth in claim 2 wherein said plates adjust said knife about said one roll such that said knife contacts said one roll tangentially regardless of its position on the periphery thereof.

6. The apparatus as set forth in calim 2 wherein said mounting plates are rotatably borne about the axis of rotation of said one roll.

7. The apparatus as set forth in claim 1 wherein said rolls are vertically offset with respect to one another, wherein said plates and the knife associated therewith are adjustable about and abut respectively the lower of said rolls, and which further comprises a second knife positioned in abutting relationship with respect to the upper of said rolls and adjustable thereabout to a position near the bottom of the upper roll whereby said belt may be brought into dough receiving relationship with respect to said second knife by adjustment of said simultaneous adjustment means.

8. In a dough sheeting apparatus having upper and lower gauging rolls between which dough is run, a section of a movable belt positioned adjacent said rolls and adapted to receive the dough as it exits from said gauge rolls, and a take-off knife positioned in abutting relation with one of said rolls and adjustable about a section of the periphery thereof, the improvement comprising:
   a mounting plate rotatably borne at either end of said one roll on the axis of rotation thereof, each of said mounting plates having an arcuate peripheral section having a series of gear teeth thereon, said knife being affixed between said plates;
   a shaft positioned parallel to the axis of rotation of said roll, said shaft having gearel sections intermeshing with the teeth on said mounting plates such that when said shaft is rotated said mounting plates rotate to move said knife to different positions on the periphery of said one roll; and
   a belt roller rotatably journaled between said plates and rotatably adjustable therewith about the axis of rotation of said one roll, said belt passing around said roller.

References Cited

UNITED STATES PATENTS

| | | | |
|---|---|---|---|
| 489,651 | 1/1893 | Karlsteen | 107—57 |
| 1,257,007 | 2/1918 | Larraburu | 107—57 |
| 1,946,843 | 2/1934 | Elliott | 107—57 |
| 2,788,752 | 4/1957 | Rhodes | 107—12 |
| 2,898,873 | 8/1959 | Cale | 107—12 |
| 2,960,044 | 11/1960 | Anetsberger | 107—12 |
| 3,002,471 | 10/1961 | Jahn | 107—12 |
| 3,055,318 | 9/1962 | Engels | 107—12 |
| 3,279,395 | 10/1966 | Butler | 107—12 |
| 3,327,652 | 6/1967 | Seewer | 107—12 |

WALTER A. SCHEEL, *Primary Examiner.*

A. O. HENDERSON, *Assistant Examiner.*